United States Patent
Jang et al.

(10) Patent No.: US 11,637,323 B2
(45) Date of Patent: Apr. 25, 2023

(54) LITHIUM BATTERY

(71) Applicants: Samsung Electronics Co., Ltd., Suwon-si (KR); Samsung SDI Co., Ltd., Yongin-si (KR)

(72) Inventors: Jihyun Jang, Yongin-si (KR); Myongchun Koh, Hwaseong-si (KR); Jinah Seo, Seoul (KR)

(73) Assignees: SAMSUNG ELECTRONICS CO., LTD., Gyeonggi-do (KR); SAMSUNG SDI CO., LTD., Gyeonggi-do (KR)

( * ) Notice: Subject to any disclaimer, the term of this patent is extended or adjusted under 35 U.S.C. 154(b) by 248 days.

(21) Appl. No.: 16/601,744

(22) Filed: Oct. 15, 2019

(65) Prior Publication Data

US 2020/0119403 A1    Apr. 16, 2020

(30) Foreign Application Priority Data

Oct. 15, 2018    (KR) .................... 10-2018-0122769

(51) Int. Cl.
| | |
|---|---|
| *H01M 10/0569* | (2010.01) |
| *H01M 10/0567* | (2010.01) |
| *H01M 10/0568* | (2010.01) |
| *H01M 4/36* | (2006.01) |
| *H01M 4/38* | (2006.01) |
| *H01M 4/505* | (2010.01) |
| *H01M 4/525* | (2010.01) |
| *H01M 10/0525* | (2010.01) |
| *H01M 4/587* | (2010.01) |

(52) U.S. Cl.
CPC ....... *H01M 10/0569* (2013.01); *H01M 4/364* (2013.01); *H01M 4/386* (2013.01); *H01M 4/505* (2013.01); *H01M 4/525* (2013.01); *H01M 4/587* (2013.01); *H01M 10/0525* (2013.01); *H01M 10/0567* (2013.01); *H01M 10/0568* (2013.01); *H01M 2300/004* (2013.01); *H01M 2300/0034* (2013.01)

(58) Field of Classification Search
None
See application file for complete search history.

(56) References Cited

U.S. PATENT DOCUMENTS

| | | | |
|---|---|---|---|
| 5,521,027 | A | 5/1996 | Okuno et al. |
| 2007/0026311 | A1* | 2/2007 | Obana ............. H01M 4/525 |
| | | | 429/223 |
| 2007/0166623 | A1 | 7/2007 | Taniguchi et al. |
| 2008/0138713 | A1 | 6/2008 | Roh et al. |
| 2010/0015533 | A1* | 1/2010 | Deguchi .......... H01M 10/0569 |
| | | | 429/338 |
| 2014/0342246 | A1 | 11/2014 | Kim |
| 2016/0204414 | A1* | 7/2016 | Takijiri ............ H01M 10/0567 |
| | | | 429/223 |
| 2018/0053967 | A1* | 2/2018 | Koh ................. H01M 10/0569 |

FOREIGN PATENT DOCUMENTS

| | | | |
|---|---|---|---|
| JP | 1997231973 | A | 9/1997 |
| JP | 2780480 | B2 | 7/1998 |
| JP | 1999162510 | A | 6/1999 |
| JP | 5153116 | B2 | 2/2013 |
| KR | 100982325 | B1 | 9/2010 |
| KR | 10-2018-0022247 | * | 3/2018 |

* cited by examiner

*Primary Examiner* — Laura Weiner
(74) *Attorney, Agent, or Firm* — Cantor Colburn LLP

(57) ABSTRACT

A lithium battery including: a cathode; an anode; and an electrolyte between the cathode and the anode, wherein the electrolyte includes a lithium salt and a non-aqueous solvent including ethylene carbonate (EC), an amount of the EC per 100 parts by volume of the non-aqueous solvent is about 5 parts by volume to about 15 parts by volume, and wherein the cathode includes a cathode active material represented by Formula 1, $$Li_xNi_yM_{1-y}O_{2-z}A_z \quad \text{Formula 1}$$

wherein, in Formula 1,
$0.9 \leq x \leq 1.2$, $0.7 \leq y \leq 0.98$, and $0 \leq z \leq 0.2$,
M is Al, Mg, Mn, Co, Fe, Cr, V, Ti, Cu, B, Ca, Zn, Zr, Nb, Mo, Sr, Sb, W, Bi, or a combination thereof, and
A is an element having an oxidation number of −1 or −2, wherein each element of M is independently present in an amount of $0 < (1-y) \leq 0.3$,
wherein an total content of M is $0.02 \leq (1-y) \leq 0.3$.

18 Claims, 1 Drawing Sheet

LITHIUM BATTERY

CROSS-REFERENCE TO RELATED APPLICATION

This application claims priority to and the benefit of Korean Patent Application No. 10-2018-0122769, filed on Oct. 15, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to lithium batteries.

2. Description of the Related Art

Lithium batteries are used as power sources for portable electronic appliances such as video cameras, mobile phones, and notebook computers. Rechargeable lithium secondary batteries have three times the energy density per unit weight than known lead batteries, nickel-cadmium batteries, nickel metal hydride batteries, and nickel-zinc batteries. Rechargeable lithium secondary batteries may also be charged at higher speeds.

A cathode active material, which provides an increased discharge capacity, may be used to manufacture a lithium second battery with high energy density. The cathode active material may also have relatively low electrochemical stability. Therefore, a side reaction between a cathode active material and an electrolyte may occur during a charge-discharge process for a lithium secondary battery. As a result, stability of the lithium secondary battery may deteriorate. Therefore, there is a need for a method of improving the stability of a lithium secondary battery, said battery including a cathode active material that provides an increased discharge capacity.

SUMMARY

Provided is an improved lithium battery.

Additional aspects will be set forth in part in the description which follows and, in part, will be apparent from the description, or may be learned by practice of the presented embodiments.

According to an aspect of an embodiment, a lithium battery includes: a cathode; an anode; and an electrolyte between the cathode and the anode, wherein the electrolyte includes a lithium salt and a non-aqueous solvent including ethylene carbonate (EC), and an amount of the EC per 100 parts by volume of the non-aqueous solvent is about 5 parts by volume to about 15 parts by volume, and wherein the cathode includes a cathode active material represented by Formula 1, Formula 1 wherein, in Formula 1,
0.9≤x≤1.2, 0.7≤y≤0.98, and 0≤z≤0.2,
M is Al, Mg, Mn, Co, Fe, Cr, V, Ti, Cu, B, Ca, Zn, Zr, Nb, Mo, Sr, Sb, W, Bi, or a combination thereof, and
A is an element having an oxidation number of −1 or −2,
wherein each element of M is independently present in an amount of 0<(1−y)≤0.3, wherein a total content of M is 0.02≤(1−y)≤0.3.

BRIEF DESCRIPTION OF THE DRAWING

These and/or other aspects will become apparent and more readily appreciated from the following description of the embodiments, taken in conjunction with the accompanying drawings in which:

FIG. is a schematic view of an embodiment of a lithium battery.

DETAILED DESCRIPTION

Figure 1:
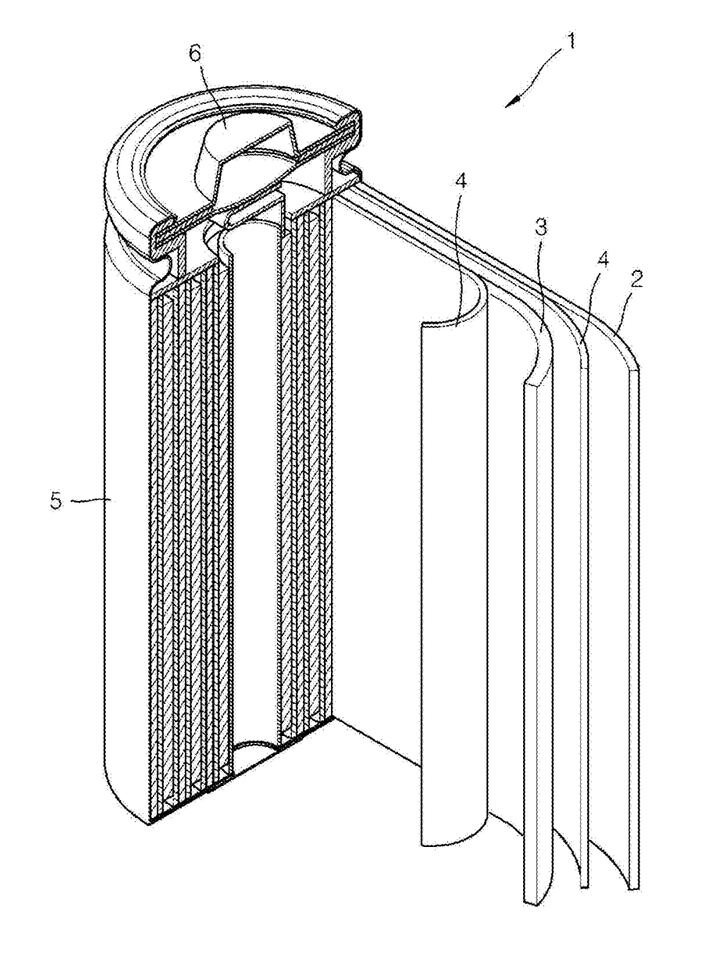

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects.

As used herein, the term "and/or" includes any and all combinations of one or more of the associated listed items. Expressions such as "at least one of," when preceding a list of elements, modify the entire list of elements and do not modify the individual elements of the list.

Hereinafter, it will be understood that "on" may include not only being directly on, but also being in a non-contacting manner. Thus when an element is referred to as being "on" another element, it can be directly on the other element, or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. The singular forms "a," "an" and "the" are intended to include the plural forms as well, unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, when a portion "includes" an element, another element may be further included, rather than excluding the existence of the other element, unless otherwise described.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the FIG. Similarly, if the device in one of the figures is turned over, elements described as "below" or "beneath" other elements would then be oriented "above" the other elements. The exemplary terms "below" or "beneath" can, therefore, encompass both an orientation of above and below.

Also, operations of all methods described herein may be performed in any suitable order unless otherwise indicated herein or otherwise clearly contradicted by context. The disclosure is not limited to the described order of the operations. The use of any and all examples, or exemplary language provided herein, is intended merely to better illuminate the disclosure and shall not be construed to pose a limitation on the scope of the disclosure unless otherwise claimed.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless defined otherwise, all terms (including technical and scientific terms) in the specification may be defined as commonly understood by one having ordinary skilled in the art. The terms defined in a generally-used dictionary may not be interpreted ideally or exaggeratedly unless clearly defined. In addition, unless explicitly described to the contrary, the word "comprise" and variations such as "comprises" or "comprising," will be understood to imply the inclusion of stated elements but not the exclusion of any other elements.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate is a measure of the rate a battery is charged or discharged relative to its maximum capacity. A 1C rate means a current which will discharge the entire capacity in one hour. Thus, for example, for a battery with a capacity of 100 ampere-hrs, a C rate discharge would be a discharge current of 100 amperes, a 5C rate for this battery would be 500 amperes, and a C/2 rate would be 50 amperes.

Hereinafter, an organic electrolyte for lithium batteries and a lithium battery employing the organic electrolyte according to example embodiments will be described in more detail.

A lithium battery according to an embodiment includes: a cathode; an anode; and an electrolyte between the cathode and the anode, wherein the electrolyte includes a lithium salt and a non-aqueous solvent including ethylene carbonate (EC), and an amount of the EC per 100 parts by volume of the non-aqueous solvent is about 5 parts by volume to about 15 parts by volume, and wherein the cathode includes a cathode active material represented by Formula 1, Formula 1 wherein, in Formula 1, 0.9≤x≤1.2, 0.7≤y≤0.98, and 0≤z≤0.2,

M is Al, Mg, Mn, Co, Fe, Cr, V, Ti, Cu, B, Ca, Zn, Zr, Nb, Mo, Sr, Sb, W, Bi, or a combination thereof, and A is an element having an oxidation number of −1 or −2, wherein each element of M is independently present in an amount of 0<(1−y)≤0.3, wherein a total content of M is 0.02≤(1−y)≤0.3.

When a lithium metal composite oxide includes a high nickel (Ni) content like the cathode active material represented by Formula 1 above, a high-power and high-capacity battery may be realized. However, metal cations such as $Ni^{2+}$ cations contained in the lithium metal composite oxide are eluted from the cathode into the electrolyte, thus causing the deterioration of the cathode. The metal cations may react with a passivation film, e.g., a solid electrolyte interphase (SEI) film, of the anode to decompose the SEI film, expose a part of the anode active material to the electrolyte, and cause a side reaction, thereby deteriorating capacity characteristics and lifetime characteristics while increasing gas generation.

It has now been surprisingly discovered that when the lithium battery includes an electrolyte including ethylene carbonate (EC) in an amount of about 5 parts by volume to about 15 parts by volume per 100 parts by volume of the non-aqueous solvent, the deterioration of the cathode due to elution of metal cations is alleviated, the capacity retention of the lithium battery is improved, the direct current internal resistance (DCIR) of the lithium battery is reduced, the gas generation of the lithium battery is reduced, and the stability of the lithium battery is improved.

For example, the amount of the EC, per 100 parts by volume of the non-aqueous solvent, may be about 7 parts by volume to about 10 parts by volume.

When the amount of the EC satisfies the above-described range, the deterioration of the cathode of the lithium battery is prevented, the capacity retention of the lithium battery is improved, and the DCIR of the lithium battery is reduced, thereby providing a lithium battery having improved lifetime characteristics.

When the amount of the EC per 100 parts by volume of the non-aqueous solvent is 5 parts by volume or less, the degree of dissociation of lithium ions at an appropriate level in a lithium battery may be difficult to secure. When the amount thereof is 15 parts by volume or more, the effect of preventing the elution of metal cations from the cathode is insignificant and the lifetime characteristics of the lithium battery may not be sufficiently improved.

In an embodiment, the non-aqueous solvent may further include fluoroethylene carbonate (FEC).

For example, the FEC may be included in the non-aqueous solvent when the anode of the lithium battery includes a silicon-carbon-nanocomposite (SCN) material as an anode active material.

The amount of the FEC, per 100 parts by volume of the non-aqueous solvent, may be about 1 part by volume to about 10 parts by volume. For example, the amount of the FEC per 100 parts by volume of the non-aqueous solvent may be about 3 parts by volume to about 5 parts by volume.

In an embodiment, the sum of the amount of the EC per 100 parts by volume of the non-aqueous solvent and the amount of the FEC per 100 parts by volume of the non-aqueous solvent is about 7 parts by volume to about 15 parts by volume, for example, about 7 parts by volume to about 10 parts by volume.

When the amounts of EC and FEC satisfy the above-described ranges, the deterioration of the anode of the lithium battery may further be prevented, the capacity retention of the lithium battery may further be improved, and the DCIR of the lithium battery may further be reduced.

The non-aqueous solvent may further include a carbonate solvent, an ester solvent, an ether solvent, a ketone solvent, a nitrile solvent, or a combination thereof, in addition to the above-described EC and FEC.

As the carbonate solvent, ethyl methyl carbonate (EMC), methyl propyl carbonate (MPC), ethyl propyl carbonate (EPC), dimethyl carbonate (DMC), diethyl carbonate (DEC), dipropyl carbonate (DPC), propylene carbonate (PC), or butylene carbonate (BC) may be used. As the ester solvent, methyl propionate, ethyl propionate, ethyl butyrate, methyl acetate, ethyl acetate, n-propyl acetate, dimethyl acetate, γ-butyrolactone, decanolide, γ-valerolactone, mevalonolactone, or caprolactone may be used. As the ether solvent, dibutyl ether, tetraglyme, diglyme, dimethoxyethane, 2-methyltetrahydrofuran, or tetrahydrofuran may be used. As the ketone solvent, cyclohexanone may be used. As the nitrile solvent, acetonitrile (AN), succinonitrile (SN), or adiponitrile may be used. As other solvents, dimethylsulfoxide, dimethylformamide, dimethylacetamide, and tetrahydrofuran may be used, but other solvents are not limited thereto. Any solvent suitable as an organic solvent may be used.

The organic solvent may include about 50 volume percent (vol %) to about 95 vol % of chain carbonate and about 5 vol % to about 50 vol % of cyclic carbonate, about 55 vol % to about 95 vol % of chain carbonate and about 5 vol % to about 45 vol % of cyclic carbonate, about 60 vol % to about 95 vol % of chain carbonate and about 5 vol % to about 40 vol % of cyclic carbonate, about 65 vol % to about 95 vol % of chain carbonate and about 5 vol % to about 35 vol % of cyclic carbonate, or about 70 vol % to about 95 vol % of chain carbonate and about 5 vol % to about 30 vol % of cyclic carbonate. For example, the organic solvent may be a mixed solvent of three or more organic solvents.

In an embodiment, the non-aqueous solvent may comprise diethyl carbonate (DEC), ethyl methyl carbonate (EMC), dipropyl carbonate (DPC), methyl propyl carbonate (MPC), ethyl propyl carbonate (EPC), methyl ethyl carbonate (MEC), propylene carbonate (PC), butylene carbonate (BC), tetraethylene glycol dimethyl ether (TEGDME), or a combination thereof.

In an embodiment, the non-aqueous solvent may comprise dimethyl carbonate (DMC), and the amount of the DMC per 100 parts by volume of the non-aqueous solvent may be about 55 parts by volume to about 80 parts by volume. For example, the current density of the electrode may be about 5.8 milliampere-hours per square centimeter (mAh/cm$^2$) to about 6.3 mAh/cm$^2$, the non-aqueous solvent may comprise the DMC, and the amount of the DMC per 100 parts by volume of the non-aqueous solvent may be about 55 parts by volume to about 80 parts by volume.

For example, the amount of the DMC per 100 parts by volume of the non-aqueous solvent may be about 60 parts by volume to about 75 parts by volume.

When the amount of the DMC satisfies the above-described range, the deterioration of the cathode of the lithium battery may further be prevented, the capacity retention of the lithium battery may further be improved, and the DCIR of the lithium battery may further be reduced. For example, the current density of the electrode may be about 5.8 mAh/cm$^2$ to about 6.3 mAh/cm$^2$.

In an embodiment, the non-aqueous solvent may not include methyl propionate (MP), ethyl propionate (EP), or propyl propionate (PP).

When the non-aqueous solvent does not include linear esters such as methyl propionate (MP), ethyl propionate (EP), and propyl propionate (PP), the deterioration of the cathode of the lithium battery may further be prevented, the capacity retention of the lithium battery may further be improved, and the DCIR of the lithium battery may further be reduced.

The lithium salt in the electrolyte may include LiPF$_6$, LiBF$_4$, LiCF$_3$SO$_3$, Li(CF$_3$SO$_2$)$_2$N, LiC$_2$F$_5$SO$_3$, Li(FSO$_2$)$_2$N, LiC$_4$F$_9$SO$_3$, LiN(SO$_2$CF$_2$CF$_3$)$_2$, a compound represented by Formulae 22 to 25,

Formula 22

Formula 23

Formula 24

Formula 25

The concentration of the lithium salt may be about 0.01 molar (M) to about 5.0 M, about 0.05 M to about 5.0 M, about 0.1 M to about 5.0 M, or about 0.1 M to about 2.0 M, but is not limited to these ranges. Any suitable concentrations may be used as needed.

According to an embodiment, the amount of the lithium salt in the electrolyte may be about 1.1 M to about 2.5 M. For example, the amount of the lithium salt in the electrolyte may be about 1.15 M to about 2.2 M or about 1.3 M to about 2 M.

When the concentration of the lithium salt satisfies the above-described range, the deterioration of the cathode of the lithium battery may further be prevented, the capacity retention of the lithium battery may further be improved, and the DCIR of the lithium battery may further be reduced. Further, when the concentration of the lithium salt satisfies the above-described range, such effects may further be improved when the current density of the electrode is about 5.8 mAh/cm² to about 6.3 mAh/cm².

The electrolyte may further include vinylene carbonate (VC), vinyl ethylene carbonate (VEC), maleic anhydride, succinic anhydride, a phosphorus (P) containing compound, a sulfur (S) containing compound, or a combination thereof.

The phosphorus containing compound may be a phosphine compound, a phosphate compound, a phosphite compound, or a combination thereof.

Examples of the phosphine compound may include, but are not limited to, triphenylphosphine or tris(4-fluorophenyl)phosphine, tris(2,4-difluorophenyl)phosphine, and tris (perfluorophenyl)phosphine. Examples of the phosphate compound may include, but are not limited to, triphenyl phosphate (TPPa), trimethyl phosphate (TMPa), and lithium difluorophosphate (LiPO$_2$F$_2$). Examples of the phosphite compound may include, but are not limited to, triethylphosphite (TEPi), trimethylphosphite, tripropylphosphite, tributylphosphite, tris (trimethylsilyl) phosphite, and triphenylphosphite.

The sulfur containing compound may be a sulfone compound, a sulfonate compound, a sultone compound, a disulfonate compound, or a combination thereof.

Examples of the sulfone compound may include, but are not limited to, dimethyl sulfone (DSO2), ethyl methyl sulfone, divinyl sulfone, bis(4-fluorophenyl) sulfone (BFPS), and tetramethylene sulfone. Examples of the sulfonate compound may include, but are not limited to, methyl methane sulfonate, ethyl methane sulfonate, and diallyl sulfonate. Examples of the disulfonate compound may include, but are not limited to, methylene methane disulfonate (MMDS) and busulfan. The sultone compound may be fluoropropate sultone (FPS), but is not limited thereto.

In an embodiment, the amount of the VC, the VEC, the maleic anhydride, the succinic anhydride, the phosphorus (P) containing compound, the sulfur (S) containing compound, or the combination thereof, per 100 parts by weight of the electrolyte, is about 0.1 parts by weight to about 2 parts by weight.

In an embodiment, the electrolyte is included in the lithium battery in an amount of about 1 gram per ampere hour (g/Ah) to about 3 g/Ah.

The cathode may include a cathode active material represented by Formula 1 above.

For example, in Formula 1 above, A may be any one of halogen, S, and N, but is not limited thereto.

For example, in Formula 1 above, y indicates the amount of Ni in the cathode active material, and may satisfy 0.88≤y≤0.98. For example, in Formula 1 above, y may satisfy 0.88≤y≤0.98.

When the amount of Ni in the cathode active material is 85% or less, a surface structure of the cathode active material may be stable, and thus deterioration of lifetime characteristics occurring in the cathode active material, such as elution or ununiformalization of metal cations (Ni$^{2+}$), may be suppressed, and the effect of controlling the amount of EC may be insignificant. However, since the amount of Ni in the cathode active material is 85% or less, the ability to increase the capacity of a battery may be limited. Therefore, when a cathode active material having a high Ni content (e.g., greater than 85%) is used to increase the capacity of a battery, the amount of EC in the electrolyte may be controlled, thereby securing a high-power and high-capacity lithium battery having an increased capacity retention and a decreased DCIR.

For example, the cathode active material may be represented by Formula 3 or 4.

$$Li_{x'}Ni_{y'}Co_{1-y'-z'}Al_{z'}O_2 \quad \text{Formula 3}$$

$$Li_{x'}Ni_{y'}Co_{1-y'-z'}Mn_{z'}O_2 \quad \text{Formula 4}$$

In Formulae 3 and 4, x', y', and z' are each independently 0.9≤x'≤1.2, 0.88≤y'≤0.98, 0<z'<0.1, and 0<1-y'-z'<0.2.

For example, the cathode may include Li$_{1.02}$Ni$_{0.88}$Co$_{0.08}$Mn$_{0.04}$O$_2$, Li$_{1.02}$Ni$_{0.88}$Co$_{0.10}$Mn$_{0.02}$O$_2$, Li$_{1.02}$Ni$_{0.91}$Co$_{0.06}$Mn$_{0.03}$O$_2$, LiNi$_{0.94}$Co$_{0.04}$Mn$_{0.02}$O$_2$, Li$_{1.02}$Ni$_{0.88}$Co$_{0.08}$Al$_{0.04}$O$_2$, Li$_{1.02}$Ni$_{0.88}$Co$_{0.10}$Al$_{0.02}$O$_2$, Li$_2$Ni$_{0.91}$Co$_{0.06}$Al$_{0.03}$O$_2$, LiNi$_{0.94}$Co$_{0.04}$Al$_{0.02}$O$_2$, or a combination thereof.

For example, the current density of the electrode may be 3 mAh/cm² or more. As another example, the current density of the electrode may be about 3.1 mAh/cm² to about 6.7 mAh/cm² or about 3.2 mAh/cm² to about 6.3 mAh/cm². As another example, the current density of the electrode may be about 3.2 mAh/cm² to about 3.5 mAh/cm² or about 6 mAh/cm² to about 6.3 mAh/cm².

Further, the cathode may include lithium cobalt oxide, lithium nickel cobalt manganese oxide, lithium nickel cobalt aluminum oxide, lithium iron oxide, lithium manganese oxide, or a combination thereof, in addition to the above-described cathode active material. However, the present disclosure is not limited thereto, and the cathode may further include any suitable cathode active material.

The anode may include an anode active material. The anode active material may include a silicon compound, a carbon compound, a composite of a silicon compound and a carbon compound, a silicon oxide of the formula SiO$_{x1}$ wherein 0<x1<2, or a combination thereof. For example, the anode may include an anode active material including a metal alloyable with lithium, a silicon anode active material, a carbon anode active material, or a combination thereof.

For example, the silicon compound may include silicon particles, and the average diameter of the silicon particles may be 200 nanometers (nm) or less.

For example, the carbon compound may include graphite.

For example, a composite of a silicon compound and a carbon compound may be a composite having a structure in which silicon nanoparticles are arranged on a carbon compound, a composite having a structure in which silicon particles are included on the surface of the carbon compound and inside the carbon compound, or a composite having a structure in which silicon particles are coated with the carbon compound and included inside the carbon compound. The composite of a silicon compound and a carbon compound may be an active material obtained by dispersing silicon nanoparticles having an average particle diameter of about 200 nm or less on carbon compound particles and then carbon-coating the resulting particles, or an active material in which silicon particles exist on graphite and inside graphite. The average particle diameter of secondary particles of the composite of the silicone compound and the carbon compound may be about 5 micrometers (μm) to about 20 μm, and the average particle diameter of the silicon nanoparticles may be 200 nm or less, 150 nm or less, 100 nm or less, 50 nm or less, 20 nm or less, 10 nm or less. For example, the average particle diameter of the silicon nanoparticles may be about 100 nm to about 150 nm.

For example, the capacity of the composite of the silicone compound and the carbon compound may be about 300 mAh/g to about 700 mAh/g. For example, the capacity of the composite of the silicone compound and the carbon compound may be about 400 mAh/g to about 600 mAh/g.

The capacity retention of the lithium battery after 200 charge-discharge cycles at 25° C. may be 80% or more, for example, 82% or more. For example, when the anode of the lithium battery includes graphite, the capacity retention of the lithium battery after 200 charge-discharge cycles at 25° C. may be 85% or more.

The DCIR of the lithium battery after 200 charge-discharge cycles at 25° C. may be 180% or less. For example, when the anode of the lithium battery includes graphite, the DCIR of the lithium battery after 200 charge-discharge cycles at 25° C. may be 150% or less, for example, 120% or less.

The cell energy density of the lithium battery per unit cell volume may be 600 watt-hours per liter (Wh/L) or more. The lithium battery may provide improved power by providing an energy density of 600 Wh/L or more.

The lithium battery is not limited in form, and may include a lithium ion battery, a lithium ion polymer battery, or a lithium sulfur battery.

The lithium secondary battery according to an embodiment may be manufactured by the following method.

First, a cathode is prepared.

For example, a cathode active material composition may be prepared in which a cathode active material, a conductive agent, a binder, and a solvent are mixed. The cathode may be prepared by coating a cathode current collector with the cathode active material composition. Alternatively, the cathode may be prepared by casting the cathode active material composition onto a separate support, separating a film from the support, and then laminating the separated film on a metal current collector. The cathode is not limited to the above-described form, but may have a form other than the above-described form.

The cathode active material may include a lithium-containing metal oxide in addition to the cathode active material represented by Formula 1 above. As the lithium-containing metal oxide, for example, two or more kinds of composite oxides of lithium and a metal selected from cobalt, manganese, nickel, and combinations thereof may be used.

For example, the cathode active material may further include a compound represented by $Li_aA_{1-b}B'_bD_2$ (wherein, $0.90 \le a \le 1.8$ and $0 \le b \le 0.5$); $Li_aE_{1-b}B'_bO_{2-c}D_c$ (wherein, $0.90 \le a \le 1.8$, $0 \le b \le 0.5$, and $0 \le c \le 0.05$); $LiE_{2-b}B \propto_b O_{4-c}D_c$ (wherein, $0 \le b \le 0.5$ and $0 \le c \le 0.05$); $Li_aNi_{1-b-c}Co_bB'_cD_\alpha$ (wherein, $0.90 \le a \le 1.8$, $0 \le b \le 0.5$, $0 \le c \le 0.05$, and $0 < \alpha \le 2$); $Li_aNi_{1-b-c}Co_bB'_cO_{2-\alpha}F'_\alpha$ (wherein, $0.90 \le a \le 1.8$, $0 \le b \le 0.5$, $0 \le c \le 0.05$, and $0 < \alpha < 2$); $Li_aNi_{1-b-c}Co_bB'_cO_{2-\alpha}F'_2$ (wherein, $0.90 \le a \le 1.8$, $0 \le b \le 0.5$, $0 \le c \le 0.05$, and $0 < \alpha < 2$); $Li_aNi_{1-b-c}Mn_bB'_cD_\alpha$ (wherein, $0.90 \le a \le 1.8$, $0 \le b \le 0.5$, $0 \le c \le 0.05$, and $0 < \alpha \le 2$); $Li_aNi_{1-b-c}Mn_bB'_cO_{2-\alpha}F'_\alpha$ (wherein, $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F'_2$ (wherein, $0.90 \le a \le 1.8$, $0 \le b \le 0.5$, $0 \le c \le 0.05$, and $0 < \alpha < 2$); $Li_aNi_bE_cG_dO_2$ (wherein, $0.90 \le a \le 1.8$, $0 \le b \le 0.9$, $0 \le c \le 0.5$, and $0.001 \le d \le 0.1$); $Li_aNi_bCo_cMn_dGeO_2$ (wherein, $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein, $0.90 \le a \le 1.8$ and $0.001 \le b \le 0.1$); $Li_aCoG_bO_2$ (wherein, $0.90 \le a \le 1.8$ and $0.001$ b $0.1$); $Li_aMnG_bO_2$ (wherein, $0.90 \le a \le 1.8$ and $0.001 \le b \le 0.1$); $Li_aMn_2G_bO_4$ (wherein, $0.90 \le a \le 1.8$ and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $LiFePO_4$, or a combination thereof.

In the formulae above, A may be Ni, Co, Mn, or a combination thereof; B' may be Al, Ni, Co, Mn, Cr, Fe, Mg, Sr, V, a rare earth element, or a combination thereof; D may be O, F, S, P, or a combination thereof; E may be Co, Mn, or a combination thereof; F' may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

For example, the compound may be $LiCoO_2$, $LiMn_xO_{2x}$ (x=1 or 2), $LiNi_{1-x}Mn_xO_{2x}$ (0<x<1), $LiNi_{1-x-y}Co_xMn_yO_2$ ($0 \le x \le 0.5$, $0 \le y \le 0.5$, 1-x-y>0.5), or $LiFePO_4$.

In an embodiment, a compound having a coating layer on the surface of the compound may be used, or a mixture of the compound and a compound having a coating layer may be used. This coating layer may include a coating element compound of an oxide of a coating element, a hydroxide of a coating element, an oxyhydroxide of a coating element, an oxycarbonate of a coating element, or a hydroxycarbonate of a coating element. The compound constituting this coating layer may be amorphous or crystalline. As the coating element included in the coating layer, Mg, Al, Co, K, Na, Ca, Si, Ti, V, Sn, Ge, Ga, B, As, Zr, or a combination thereof may be used. In the process of forming the coating layer, any suitable coating method may be used as long as this compound may be coated with such elements by a method that does not adversely affect the physical properties of the cathode active material (for example, spray coating, dipping or the like). This coating method will be understood by those skilled in the art, and therefore a detailed description thereof will be omitted.

A conductive agent, a filler, and the like may be further added to the cathode active material composition.

The conductive agent is usually added in an amount of about 1 weight percent (wt %) to about 30 wt % based on the total weight of the mixture including the cathode active material. Such a conductive agent is not limited as long as it has electrical conductivity without causing a chemical change in the battery. Examples thereof may include graphite such as natural graphite or artificial graphite; carbon black, acetylene black, ketjen black, channel black, furnace black, lamp black, and summer black; conductive fibers such as carbon fiber and metal fiber; carbon fluoride; metal powder such as aluminum powder and nickel powder; conductive whiskey such as zinc oxide and potassium titanate; conductive metal oxides such as titanium oxide; and conductive agents such as polyphenylene derivatives.

The binder is a component that assists in binding of the active material and the conductive agent and binding of the active material to the current collector, and may be added in an amount of about 1 wt % to about 30 wt % based on the total weight of the cathode active material composition. Examples of the binder may include polyvinylidene fluoride (PVdF), polyvinylidene chloride, polybenzimidazole, polyimide, polyvinyl acetate, polyacrylonitrile, polyvinyl alcohol, carboxymethylcellulose (CMC), starch, hydroxypropylcellulose, regenerated cellulose, polyvinylpyrrolidone, polyethylene, polypropylene, polystyrene, polymethyl methacrylate, polyaniline, acrylonitrile butadiene styrene resin, phenol resin, epoxy resin, polyethylene terephthalate, polytetrafluoroethylene, polyphenylene sulfide, polyamide-imide, polyetherimide, polyether sulfone, polyamide, polyacetal, polyphenylene oxide, polybutylene terephthalate, ethylene-propylene-diene terpolymer (EPDM), sulfonated EPDM, styrene butadiene rubber (SBR), fluorine rubber, and various copolymers. The filler is a component for suppressing the expansion of the cathode. The filler is not limited as long as it is a fibrous material which does not cause a chemical change in the battery. Examples thereof may include olefin polymers such as polyethylene and polypropylene; and fibrous materials such as glass fiber and carbon fiber.

As the solvent, N-methylpyrrolidone, acetone, water, or the like may be used, but the solvent is not limited thereto, and any suitable solvent may be used. The amount of the solvent may be, for example, about 10 parts by weight to about 100 parts by weight based on 100 parts by weight of the cathode active material. When the amount of the solvent is within the above range, ease of formation of an active material layer is improved.

The amount of the cathode active material, the amount of the conductive agent, the amount of the filler, and the amount of the solvent are suitable levels for use in a lithium battery. The conductive agent, the filler, the binder, the solvent, or a combination thereof, may be omitted depending on the use and configuration of the lithium battery.

For example, N-methylpyrrolidone (NMP) may be used as the solvent, a PVdF or PVdF copolymer was used as the binder, and carbon black or acetylene black may be used as the conductive agent. For example, 94 wt % of the cathode active material, 3 wt % of the binder, and 3 wt % of the conductive agent may be mixed in a powder state, NMP may be added such that solid content is 70 wt %, a slurry may be formed therefrom, and this slurry may then be coated, dried, and rolled to manufacture the cathode.

The cathode current collector may be formed with a thickness of about 3 µm to about 50 µm. This cathode current collector is not limited as long as it has suitable conductivity without causing a chemical change in the battery. For example, the cathode current collector may include stainless steel, aluminum, nickel, titanium, or calcined carbon, or may include aluminum or stainless steel surface-treated with carbon, nickel, titanium, or silver. The cathode current collector may form fine uneven structures on its surface to increase the adhesive force of the cathode active material, and may have various forms such as film, sheet, foil, net, porous body, foam, and nonwoven fabric.

For example, the cathode may be produced by applying, drying and pressing a cathode active material on a cathode current collector, and a cathode active material composition, in which a binder is mixed with a solvent, may be prepared as needed in addition to the above-described active material. The cathode active material composition may be directly applied on a metal current collector and dried to produce a cathode plate. Alternatively, the cathode active material composition may be cast onto a separate support, a film may be separated from the support, and then the separated film may be laminated on a metal current collector to produce a cathode plate.

For example, the loading level of the produced cathode active material may be 30 milligrams per square centimeter (mg/cm$^2$) or more, for example, 35 mg/cm$^2$ or more, and for example, 40 mg/cm$^2$ or more. Further, electrode density may be 3 grams per cubic centimeter (g/cc) or more, for example, 3.5 g/cc or more.

In an embodiment, for improved cell energy density, the loading level of the produced cathode active material may be about 35 mg/cm$^2$ to about 50 mg/cm$^2$, and the electrode density may be about 3.5 g/cc to about 4.2 g/cc or more.

In another embodiment, both sides of the cathode plate may be coated with the cathode active material composition at a loading level of 37 mg/cm$^2$ and an electrode density of 3.6 g/cc.

When the loading level of the cathode active material and the electrode density satisfy the above ranges, a battery including this cathode active material may exhibit a high cell energy density of 600 wh/L or more. For example, the battery may exhibit a cell energy density of about 600 wh/L to about 900 wh/L.

Next, an anode is prepared.

For example, an anode active material composition may be prepared in which an anode active material, a conductive agent, a binder, and a solvent are mixed.

The anode may be prepared by applying, drying and pressing an anode active material on an anode current collector, and a negative electrode active material composition, in which a binder is mixed with a solvent in addition to the above-described negative electrode active material, may be prepared as needed.

For example, the anode may be prepared by directly coating an anode current collector with the anode active material composition and drying the anode active material composition. Alternatively, the anode may be prepared by casting the anode active material composition onto a separate support, separating a film from the support, and then laminating the separated film on a metal current collector.

The anode active material may be, for example, a silicon compound, silicon oxide of formula $SiO_x$ wherein $0<x<2$, or a composite of a silicon compound and a carbon material. Here, the size (e.g., average particle diameter) of silicon particles may be less than 200 nm, for example, about 10 nm to about 150 nm. The term "size" may refer to an average particle diameter when silicon particles are spherical, and may refer to an average long axis length when the silicon particles are non-spherical.

When the size of the silicon particles is within the above range, lifetime characteristics of a lithium secondary battery are improved.

The carbon material may be crystalline carbon, amorphous carbon, or a combination thereof. The crystalline carbon may be graphite, such as natural graphite, or artificial graphite of an amorphous, plate-like, flake-like, spherical or fibrous form. The amorphous carbon may be soft carbon (e.g., low-temperature calcined carbon), hard carbon, mesophase pitch carbide, or calcined coke.

The composite of a silicon compound and a carbon material may be a composite having a structure in which silicon particles are arranged on graphite, or a composite having a structure in which silicon particles are included on the surface of graphite and inside graphite. The composite may be, for example, an active material in which silicon (Si) particles having an average particle diameter of 200 nm or less, for example, about 100 nm to about 200 nm, and for example, 150 nm are dispersed on graphite particles and then coated with carbon, or an active material in which silicon (Si) particles exist on graphite and inside graphite. Such a composite is commercially available as the trade name SCN1 (Si particle on Graphite) or SCN2 (Si particle inside as well as on graphite). SCN1 may be an active material obtained by dispersing silicon (Si) particles having an average particle diameter of about 150 nm on graphite particles and then coating the dispersed silicon (Si) particles with carbon. SCN2 is an active material in which silicon (Si) particles having an average particle diameter of about 150 nm exist on graphite and inside graphite.

The anode active material may be used together with the above-described anode active material as long as it is suitable as the anode active material of a lithium secondary battery. For example, the anode active material may be, Si, Sn, Al, Ge, Pb, Bi, Sb, a Si—Y' alloy (wherein Y' comprises alkali metals, alkaline earth metals, Group 13 to Group 16 elements, transition metals, transition metal oxides, rare earth elements, or a combination thereof, wherein Y' does not comprise Si), or a Sn—Y' alloy (wherein Y' comprises alkali metals, alkaline earth metals, Group 13 to Group 16 elements, transition metals, transition metal oxides, rare earth elements, or a combination thereof, wherein Y' does not comprise Sn). The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the anode active material may be lithium titanium oxide, vanadium oxide, or lithium vanadium oxide.

A conductive agent, a filler, and the like may be further added to the anode active material composition.

The binder, solvent, conductive agent, and filler in the anode active material composition may be the same as those in the above-described cathode active material composition.

However, in the anode active material composition, water may be used as the solvent. For example, water may be used as the solvent, carboxymethyl cellulose (CMC), styrene butadiene rubber (SBR), an acrylate-based polymer, or a methacrylate-based polymer may be used as the binder. Carbon black, acetylene black, or graphite may be used as the conductive agent.

The amount of the anode active material, the amount of the conductive agent, the amount of the binder, and the amount of the solvent are suitable levels for use in a lithium secondary battery. The conductive agent, the binder, the solvent, or a combination thereof, may be omitted depending on the use and configuration of the lithium secondary battery.

For example, 94 wt % of the anode active material, 3 wt % of the binder, and 3 wt % of the conductive agent may be mixed in a powder state, water may be added such that solid content is 70 wt %, a slurry may be formed, this slurry may then be coated, dried and rolled to manufacture an anode plate.

The anode current collector may have a thickness of about 3 μm to about 50 μm. This anode current collector is not limited as long as it has suitable conductivity without causing a chemical change in the battery. For example, the anode current collector may include copper, stainless steel, aluminum, nickel, titanium, or calcined carbon, may include copper or stainless steel surface-treated with carbon, nickel, titanium or silver, or may include an aluminum-cadmium alloy. Similarly to the cathode current collector, the anode current collector may form fine uneven structures on its surface to increase the adhesive force of the anode active material, and may have various forms such as film, sheet, foil, net, porous body, foam, and nonwoven fabric.

The loading level of the prepared anode active material composition may be set according to the loading level of the cathode active material composition.

For example, the loading level of the anode active material composition may be 12 mg/cm$^2$ or more, for example, 15 mg/cm$^2$ or more, depending on the capacity of the anode active material composition per gram. Further, electrode density may be 1.5 g/cc or more, for example, 1.6 g/cc or more.

In an embodiment, for improved cell energy density, the loading level of the prepared anode active material composition may be about 15 mg/cm$^2$ to about 25 mg/cm$^2$, and the electrode density may be about 1.6 g/cc to about 2.3 g/cc or more.

When the loading level of the anode active material and the electrode density satisfy the above ranges, a battery including this cathode active material may exhibit a high cell energy density of 600 wh/L or more.

Next, a separator to be inserted between the anode and the cathode is prepared.

Any separator may be used as long as it is suitable for use in a lithium battery. A separator having suitable resistance to the movement of ions in the electrolyte and suitable electrolyte wettability may be used. For example, the separator may include glass fiber, polyester, Teflon, polyethylene, polypropylene, polytetrafluoroethylene (PTFE), or a combination thereof, and may be made in the form of nonwoven fabric or woven fabric. For example, a windable separator including polyethylene, polypropylene, or the like may be used in a lithium ion battery, and a separator having suitable electrolyte impregnation ability may be used in a lithium ion polymer battery. For example, the separation film may be produced by the following method.

A polymer resin, a filler, and a solvent may be mixed to prepare a separator composition. The separator composition may be directly applied on an electrode and dried to form a separator. Further, the separator composition may be cast on a support and dried, a separation film may be separated from the support, and then the separation film may be laminated on the electrode to form a separator.

The polymer resin used in the production of the separator is not limited, and any material may be used as long as it is suitable for use in a binder of an electrode plate. For example, as the polymer resin, a vinylidene fluoride/hexafluoropropylene copolymer, polyvinylidene fluoride (PVDF), polyacrylonitrile, polymethyl methacrylate, or a combination thereof may be used.

Next, the above-described electrolyte is prepared.

According to an embodiment, in addition to the above-described electrolyte, a non-aqueous electrolyte, a solid electrolyte, an organic solid electrolyte, or an inorganic solid electrolyte may be used.

As the organic solid electrolyte, for example, a polyethylene derivative, a polyethylene oxide derivative, a polypropylene oxide derivative, a phosphate ester polymer, a polyester sulfide, a polyvinyl alcohol, a polyvinylidene fluoride, or a polymer including an ionic dissociation group may be used.

As the inorganic solid electrolyte, for example, $Li_3N$, $LiI$, $Li_5NI_2$, $Li_3N$—$LiI$—$LiOH$, $LiSiO_4$, $Li_2SiS_3$, $Li_4SiO_4$, $Li_4SiO_4$—$LiI$—$LiOH$, or $Li_3PO_4$—$Li_2S$—$SiS_2$ may be used.

As shown in FIGURE, the lithium secondary battery 1 includes a cathode 3, an anode 2, and a separator 4. The anode 3, the cathode 2, and the separator are wound or folded and accommodated in a battery case 5. Then, an electrolyte is injected into the battery case 5, and the battery case 5 is sealed with a cap assembly 6 to complete the lithium secondary battery 1. The battery case 5 may have a cylindrical shape, a rectangular shape, or a thin film shape. For example, the lithium secondary battery 1 may be a large-sized thin-film battery. The lithium secondary battery 1 may be a lithium ion battery.

The separator may be located between the anode and the cathode to form a battery structure. The battery structure may be laminated as a bi-cell structure and then impregnated with an electrolyte, and the resulting product is accommodated in a pouch and sealed to complete a lithium ion polymer battery.

Further, the plurality of battery structures are laminated to form a battery pack, and this battery pack may be used in all appliances requiring high capacity and high power. For example, the battery pack may be used in notebooks, smart phones, electric vehicles, and the like.

The lithium secondary battery according to an embodiment significantly reduces a DCIR as compared with a lithium secondary battery employing a nickel-rich lithium-nickel composite oxide as a cathode active material, and thus the lithium secondary battery according to an embodiment may exhibit improved battery characteristics.

The operating voltage of the lithium secondary battery to which the anode, the cathode, and the electrolyte are applied may be, for example, about 2.5 volts (V) to about 4.4 V, for example, about 2.8 V to about 4.1 V, and the energy density may be 500 wh/L or more, which is good.

Further, the lithium secondary battery may be used in, for example, power tools operated by a power from an electric motor; electric vehicles including a hybrid electric vehicle (HEV) and a plug-in hybrid electric vehicle (PHEV); electric motorcycles including an electric bike (E-bike) and an electric scooter (E-scooter); electric golf carts; and power storage systems, but the present disclosure is not limited thereto.

As used herein, alkyl refers to fully saturated branched or unbranched (or linear or linear) hydrocarbons.

Non-limiting examples of "alkyl" may include methyl, ethyl, n-propyl, isopropyl, n-butyl, isobutyl, sec-butyl, n-pentyl, isopentyl, neopentyl, n-hexyl, 3-methylhexyl, 2,2-dimethylpentyl, 2,3-dimethylpentyl, and n-heptyl.

A hydrogen atom of "alkyl" may be substituted with a halogen atom, a halogen atom-substituted alkyl group of $C_1$-$C_{20}$ (e.g., $CCF_3$, $CHCF_2$, $CH_2F$, or $CCl_3$), an alkoxy group of $C_1$-$C_{20}$, an alkoxyalkyl group of $C_2$-$C_{20}$, a hydroxyl group, a nitro group, a cyano group, an amino group, an amidino group, hydrazine, hydrazone, a carboxyl group or a salt thereof, a sulfonyl group, a sulfamoyl group, a sulfonic acid group or a salt thereof, phosphoric acid or a salt thereof, an alkyl group of $C_1$-$C_{20}$, an alkenyl group of $C_2$-$C_{20}$, an alkynyl group of $C_2$-$C_{20}$, a heteroalkyl group of $C_1$-$C_{20}$, an aryl group of $C_6$-$C_{20}$, an arylalkyl group of $C_6$-$C_{20}$, a heteroaryl group of $C_6$-$C_{20}$, a heteroarylalkyl group of $C_7$-$C_{20}$, a heteroaryloxy group of $C_6$-$C_{20}$, a heteroaryloxyalkyl group of $C_6$-$C_{20}$, or a heteroarylalkyl group of $C_6$-$C_{20}$.

The term "halogen" may include fluorine, bromine, chlorine, and iodine.

The "alkoxy" denotes "alkyl-O—", wherein alkyl is as described above. Examples of the alkoxy group may include a methoxy group, an ethoxy group, a 2-propoxy group, a butoxy group, a t-butoxy group, a pentyloxy group, and a hexyloxy group. A hydrogen atom of the alkoxy may be substituted with the same substituent as the above-described alkyl group.

The "alkenyl" refers to branched or unbranched hydrocarbons having a carbon-carbon double bond. Non-limiting examples of the alkenyl group may include vinyl, allyl, butenyl, propenyl, and isobutenyl, and a hydrogen atom of the alkenyl may be substituted with the same substituent as the above-described alkyl group.

The "alkynyl" refers to branched or unbranched hydrocarbons having a carbon-carbon triple bond. Non-limiting examples of the alkynyl may include ethynyl, butynyl, isobutynyl, and isopropynyl.

A hydrogen atom of the alkynyl may be substituted with the same substituent as the above-described alkyl group. The "aryl" may include a group in which an aromatic ring is selectively fused to one or more carbon rings. Non-limiting examples of the aryl may include phenyl, naphthyl, and tetrahydronaphthyl. A hydrogen atom of the "aryl" group may be substituted with the same substituent as the above-described alkyl group.

The "heteroaryl" refers to a monocyclic or bicyclic organic group including a heteroatom selected from N, O, P, or S and having carbon atoms as remaining ring atoms. The heteroaryl group may include, for example, 1 to 5 hetero atoms, and may include 5-10 ring members. The S or N may be oxidized to have various oxidation states.

Examples of the heteroaryl may include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, Isothiazol-4-yl, isothiazol-5-yl, oxazol-2-yl, oxazol-4-yl, oxazol-5-yl, isooxazol-3-yl, isooxazol-4-yl, isooxazol-5-yl, 1,2,4-triazol-3-yl, 1,2, 4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, and 5-pyrimidin-2-yl.

The term "heteroaryl" includes a case where a heteroaromatic ring is selectively fused to at least one of aryl, cycloaliphatic, and heterocyclic.

Hereinafter, the present disclosure will be described in more detail with reference to Examples and Comparative Examples. However, these Examples are for illustrating the present disclosure, and the scope of the present disclosure is not limited thereto.

EXAMPLES

Example 1 and Comparative Examples 1 to 3

Preparation of Organic Electrolyte

An organic electrolyte was prepared according to the composition given in Table 1 below. $LiPF_6$ was used as a lithium salt.

TABLE 1

| | Concentration of lithium salt (M) | EC (vol %) | EMC (vol %) | DMC (vol %) | FEC (vol %) | Additives |
|---|---|---|---|---|---|---|
| Comparative Example 1 | 1.15 | 40 | 20 | 40 | 0 | VC |
| Comparative Example 2 | 1.15 | 30 | 30 | 40 | 0 | VC |
| Comparative Example 3 | 1.15 | 20 | 40 | 40 | 0 | VC |
| Example 1 | 1.15 | 10 | 50 | 40 | 0 | VC |

Preparation of Cathode 97.7 wt % of $Li_{1.09}Ni_{0.88}Co_{0.08}Mn_{0.04}O_2$ as a cathode active material, 0.7 wt % of carbon nanotubes (CNT) and 0.3 wt % of carbon black as a conductive agent, 1.1 wt % of PVDF (SOLEF 6020, manufactured by Solvay Corporation) as a binder, and 0.2 wt % of a dispersant were mixed to obtain a mixture, and the mixture was introduced into a N-methyl-2-pyrrolidone (NMP) solvent to a solid content of 70% and stirred for 30 minutes using a mechanical stirrer to prepare a cathode active material composition. The cathode active material composition was applied onto both sides of an aluminum foil current collector having a thickness of 12 μm to a loading level of 33.6 mg/cm² using a 3-roll coater, dried at 100° C. for 0.5 hours using a hot drier, further dried in a vacuum at 120° C. for 4 hours, and then roll-pressed to prepare a cathode provided with a cathode active material layer having a density of 3.7 g/cc on the current collector. The current density of the cathode was 3.4 mAh/cm².

Preparation of Anode 97 wt % of graphite powder (MC20, purity of 99.9% or more, manufactured by Mitsubishi Chemical Corporation) as an anode active material was mixed with 1.5 wt % of styrene butadiene rubber (SBR) and 1.5 wt % of carboxymethyl cellulose as a binder to obtain a mixture, and the mixture was introduced into an aqueous solvent to a solid content of 50% and stirred for 60 minutes using a mechanical stirrer to prepare an anode active material composition. The anode active material composition was applied onto both sides of a copper foil current collector having a thickness of 10 μm to a loading level of 21.87 mg/cm² using a 3-roll coater, dried at 100° C. for 0.5 hours using a hot drier, further dried in a vacuum at 120° C. for 4 hours, and then roll-pressed to prepare an anode provided with an anode active material layer having a density of 1.65 g/cc on the current collector.

Assembly of Lithium Battery

A 18650 cylindrical lithium battery was manufactured using the prepared cathode, the prepared anode, a polyethylene separator, and the prepared electrode.

Examples 2 to 4 and Comparative Examples 5 to 9

A lithium battery was manufactured in the same manner as in Example 1, except that the composition given in Table 2 was used as an organic electrolyte, the current density of the cathode was set to 4.4 mAh/cm², 15.7 wt % of silicon carbon composite (SCN) and 80.3 wt % of graphite powder (G1/JPS, purity of 99.9% or more) were used as an anode active material, and 4 wt % of an acrylic (AG) binder was used as a binder.

an aluminum foil current collector having a thickness of 12 μm to a loading level of 61.13 mg/cm² using a 3-roll coater, dried at 100° C. for 0.5 hours using a hot drier, further dried in a vacuum at 120° C. for 4 hours, and then roll-pressed to prepare a cathode provided with a cathode active material layer having a density of 3.7 g/cc on the current collector. The current density of the cathode was 6.3 mAh/cm².

Preparation of Anode 15.7 wt % of silicon carbon composite (SCN) and 80.3 wt % of graphite powder (G1/JPS, purity of 99.9% or more) as an anode active material were mixed with 4 wt % of an acrylic (AG) binder as a binder to obtain a mixture, and the mixture was introduced into an aqueous solvent to a solid content of 50% and stirred for 60 minutes using a mechanical stirrer to prepare an anode active material composition. The anode active material composition was applied onto both sides of a copper foil current collector having a thickness of 10 μm to a loading level of 26.67 mg/cm² using a 3-roll coater, dried at 100° C. for 0.5 hours using a hot drier, further dried in a vacuum at 120° C. for 4 hours, and then roll-pressed to prepare an anode provided with an anode active material layer having a density of 1.65 g/cc on the current collector.

Assembly of Lithium Battery

A stack-type lithium battery was manufactured using the prepared cathode, the prepared anode, a polyethylene separator, and the prepared electrode.

TABLE 2

| | Concentration of lithium salt (M) | EC (vol %) | EMC (vol %) | DMC (vol %) | FEC (vol %) | PP (vol %) | Additives |
|---|---|---|---|---|---|---|---|
| Comparative Example 5 | 1 | 47 | 0 | 50 | 3 | 0 | VC |
| Example 2 | 1 | 7 | 40 | 50 | 3 | 0 | VC |
| Comparative Example 6 | 1.15 | 47 | 0 | 50 | 3 | 0 | VC |
| Example 3 | 1.15 | 7 | 40 | 50 | 3 | 0 | VC |
| Comparative Example 7 | 2 | 47 | 0 | 50 | 3 | 0 | VC |
| Example 4 | 2 | 7 | 40 | 50 | 3 | 0 | VC |
| Comparative Example 8 | 1.3 | 20 | 35 | 0 | 5 | 40 | VC/FTPhSi/BFPS |
| Comparative Example 9 | 1.3 | 5 | 0 | 45 | 5 | 45 | VC/FTPhSi/BFPS |

Examples 5 to 8

Preparation of Cathode 97.7 wt % of $Li_{1.09}Ni_{0.88}Co_{0.08}Mn_{0.04}O_2$ as a cathode active material, 0.7 wt % of carbon nanotubes (CNT) and 0.3 wt % of carbon black as a conductive agent, 1.1 wt % of PVDF (SOLEF 6020, manufactured by Solvay Corporation) as a binder, and 0.2 wt % of a dispersant were mixed to obtain a mixture, and the mixture was introduced into a N-methyl-2-pyrrolidone (NMP) solvent to a solid content of 70% and stirred for 30 minutes using a mechanical stirrer to prepare a cathode active material composition. The cathode active material composition was applied onto both sides of

TABLE 3

| | Concentration of lithium salt (M) | EC (vol %) | EMC (vol %) | DMC (vol %) | FEC (vol %) | Additives |
|---|---|---|---|---|---|---|
| Example 5 | 1.15 | 10 | 47 | 40 | 3 | DPhS/TPPa |
| Example 6 | 1.3 | 10 | 47 | 40 | 3 | DPhS/TPPa |
| Example 7 | 1.3 | 10 | 17 | 70 | 3 | DPhS/TPPa |
| Example 8 | 1.3 | 10 | 17 | 70 | 3 | DPhS/TPPa |

Evaluation Example 1: Evaluation of Capacity Retention and Direct Current Internal Resistance Characteristics (1) Evaluation of Charge-Discharge Characteristics at Room Temperature (25° C.)

Each of the lithium batteries was charged with a current of 0.2 C rate at 25° C. until a voltage reached 3.6 V (vs. Li), and then discharged at a constant current of 0.2 C rate until a voltage reached 2.8 V (vs. Li) (formation, 1st cycle). Further, each of the lithium batteries was charged with a current of 0.2 C rate until a voltage reached 4.3 V (vs. Li), and then cut off at a current of 0.05 C rate while maintaining 4.3 V of a voltage in a constant voltage mode. Then, each of the lithium batteries was discharged at a constant current of 0.2 C rate until a voltage reached 2.8 V (vs. Li) (first formation, 1st and $2^{nd}$ cycles).

Each of the lithium batteries having undergone the above first formation was charged with a current of 0.5 C rate at 25° C. until a voltage reached 4.3 V (vs. Li), and then cut off at a current of 0.05 C rate while maintaining 4.3 V of a voltage in a constant voltage mode. Then, each of the lithium batteries was discharged at a constant current of 0.2 C rate until a voltage reached 2.8 V (vs. Li). This process was carried out for two cycles (second formation, $3^{rd}$ and $4^{th}$ cycles).

Each of the lithium batteries having undergone the above second formation was charged with a current of 1 C rate at 25° C. until a voltage reached 4.3 V (vs. Li), and then cut off at a current of 0.05 C rate while maintaining 4.3 V of a voltage in a constant voltage mode. Then, each of the lithium batteries was discharged at a constant current of 1.0 C rate until a voltage reached 2.8 V (vs. Li). These charge-discharge cycles were repeated 200 times.

A stop time of 20 minutes was provided after one charge-discharge cycle in the above charge-discharge cycles.

Some of the results of the charge-discharge experiments are given in Table 4 below.

The capacity retention in the 200th cycle was defined by Equation 1 below.

$$\text{Capacity retention rate} = [\text{discharge capacity at } 200^{th} \text{ cycle}/\text{discharge capacity at } 1^{st} \text{ cycle}] \times 100\% \quad \text{Equation 1}$$

(2) Evaluation of Direct Current Internal Resistance (DCIR) at Room Temperature (25° C.)

The DCIR of each of the lithium battery after 1 cycle of charge-discharge, and the lithium battery after 200 charge-discharge cycles at room temperature (25° C.), in the evaluation of lifetime characteristics in item (1) above, was measured by the following method.

After each of the lithium batteries was charged with a current of 0.5 C to a voltage of 50% state of charge (SOC) in the 1st cycle, cut off at 0.02 C, and then stopped for 10 minutes,
each of the lithium batteries was discharged at a constant current of 0.5 C for 30 seconds, stopped for 30 seconds, charged with a constant current of 0.5 C for 30 seconds, and then stopped for 10 minutes,
each of the lithium batteries was discharged at a constant current of 1.0 C for 30 seconds, stopped for 30 seconds, charged with a constant current of 0.5 C for 1 minute, and then stopped for 10 minutes,
each of the lithium batteries was discharged at a constant current of 2.0 C for 30 seconds, stopped for 30 seconds, charged with a constant current of 0.5 C for 2 minutes, and then stopped for 10 minutes, and
each of the lithium batteries was discharged at a constant current of 3.0 C for 30 seconds, stopped for 30 seconds, charged with a constant current of 0.5 C for 2 minutes, and then stopped for 10 minutes.

The average voltage drop value for each C-rate for 30 seconds is a DC voltage value. DC resistances were calculated from the measured DC voltages, and the results thereof are given in Table 4 below.

DCIR is calculated by Equation 2 below.

$$\text{DCIR increase}[\%] = [\text{direct current after 200 cycles of charge-discharge}/\text{direct current after 1 cycle of charge-discharge}] \times 100\% \quad \text{Equation 2}$$

TABLE 4

|  | Capacity retention (%) | DCIR increase (%) |
| --- | --- | --- |
| Comparative Example 1 | 38.8 | 260 |
| Comparative Example 2 | 52.3 | 236 |
| Comparative Example 3 | 78.5 | 203 |
| Example 1 | 86.6 | 146 |
| Comparative Example 5 | 57.7 | 211 |
| Example 2 | 82.7 | 171 |
| Comparative Example 6 | 78.8 | 190 |
| Example 3 | 82.6 | 169 |
| Comparative Example 7 | 82.4 | 184 |
| Example 4 | 83.0 | 164 |
| Comparative Example 8 | 52.9 | 260 |
| Comparative Example 9 | 75.0 | 194 |
| Example 5 | 83.0 | 119 |
| Example 6 | 85.1 | 118 |
| Example 7 | 88.4 | 105 |
| Example 8 | 87.7 | 114 |

Referring to Table 4 above, it was found that the lithium batteries of Examples 1 to 8 have high capacity retention, low direct current internal resistance increase, and exhibit improved stability as compared with the lithium batteries of Comparative Examples 1 to 9.

Further, referring to Comparative Examples 8 and 9, it was found that the lithium batteries of Examples 1 to 8 have high capacity retention, low direct current internal resistance increase, and exhibit improved stability compared to when an organic electrolyte including PP as a chain ester compound (PP) was used.

Evaluation Example 2; Evaluation of Metal Elution Amount of Cathode

With respect to the lithium batteries of Example 1 and Comparative Examples 1 to 3, results of elemental analysis, in part per million (ppm), of cathodes of each of the lithium batteries using an inductively coupled plasma atomic emission spectrum (ICP-AES) analysis method are given in Table 5 below. In Table 5 below, SOC refers to state of charge (%).

TABLE 5

|  | ICP-AES (ppm) | | | | | |
| --- | --- | --- | --- | --- | --- | --- |
|  | Li | Mn | Co | Ni | Al | Zr |
| Comparative Example 1 (SOC 0) | 20110 | 60 | 56 | 822 | 447 | 25 |
| Comparative Example 1 (SOC 100) | 65009 | 83 | 70 | 1315 | 183 | 53 |
| Comparative Example 2 (SOC 0) | 21071 | 58 | 44 | 782 | 422 | 31 |
| Comparative Example 2 (SOC 100) | 66457 | 51 | 39 | 702 | 217 | 23 |

TABLE 5-continued

| | ICP-AES (ppm) | | | | | |
|---|---|---|---|---|---|---|
| | Li | Mn | Co | Ni | Al | Zr |
| Comparative Example 3 (SOC 0) | 21327 | 32 | 18 | 355 | 355 | 25 |
| Comparative Example 3 (SOC 100) | 66050 | 33 | 22 | 421 | 192 | 18 |
| Example 1 (SOC 0) | 16486 | 18 | 12 | 251 | 388 | 27 |
| Example 1 (SOC 100) | 69176 | 19 | 12 | 255 | 232 | 32 |

Referring to Table 5 above, it was found that the amounts of Mn, Co, and Ni detected from the anode of the lithium battery of Example 1 are remarkably smaller than those detected from the anode of each of the lithium batteries of Comparative Examples 1 to 3. From this, it is ascertained that smaller amounts of Mn, Co, and Ni were eluted from the cathode of the lithium battery of Example 1 as compared with the lithium batteries of Comparative Examples 1 to 3, and thus degree of deterioration of the surface of the cathode is improved.

Reference Examples 1 to 9

Lithium batteries were manufactured in the same manner as in Example 1, except that the composition given in Table 6 below was used as an organic electrolyte, a cathode active material, and an anode active material.

TABLE 6

| | Cathode active material | Anode active material | Li salt (M) | EC (vol %) | EMC (vol %) | DMC (vol %) | FEC (vol %) | Additives |
|---|---|---|---|---|---|---|---|---|
| | | | | Organic electrolyte | | | | |
| Reference Example 1 | Ni 80% NCM | graphite | 1.15 | 7 | 46 | 40 | 7 | VC/LiDFOB/TMSPi |
| Reference Example 2 | Ni 80% NCM | graphite | 1.15 | 0 | 40 | 40 | 20 | VC/LiDFOB/TMSPi |
| Reference Example 3 | Ni 80% NCM | graphite | 1.15 | 15 | 40 | 40 | 5 | VC/LiDFOB/TMSPi |
| Reference Example 4 | Ni 80% NCM | SCN | 1.15 | 7 | 46 | 40 | 7 | VC/LiDFOB/TMSPi |
| Reference Example 5 | Ni 80% NCM | SCN | 1.15 | 15 | 40 | 40 | 5 | VC/LiDFOB/TMSPi |
| Reference Example 6 | Ni 80% NCM | SCN | 1.15 | 10 | 40 | 40 | 10 | VC/LiDFOB/TMSPi |
| Reference Example 7 | Ni 80% NCM | SCN | 1.15 | 0 | 40 | 40 | 20 | VC/LiDFOB/TMSPi |
| Reference Example 8 | Ni 60% NCM | graphite | 1.15 | 20 | 20 | 60 | 0 | VC/LiPO$_2$F$_2$ |
| Reference Example 9 | Ni 60% NCM | SCN | 1.15 | 20 | 35 | 40 | 5 | — |

The capacity retention and direct current internal resistance characteristics of the lithium batteries of Reference Examples 1 to 9 were evaluated in the same manner as in Evaluation Example 1, and the results thereof are given in Table 7 below.

TABLE 7

| | Cathode | Anode | Capacity retention (%) | DCIR increase (%) |
|---|---|---|---|---|
| Reference Example 1 | Ni 80% NCM | graphite | 86.5 | 118 |
| Reference Example 2 | Ni 80% NCM | graphite | 86.0 | 119 |
| Reference Example 3 | Ni 80% NCM | graphite | 85.6 | 121 |
| Reference Example 4 | Ni 80% NCM | SCN | 73.6 | 114 |
| Reference Example 5 | Ni 80% NCM | SCN | 73.4 | 127 |
| Reference Example 6 | Ni 80% NCM | SCN | 73.5 | 127 |
| Reference Example 7 | Ni 80% NCM | SCN | 72.3 | 123 |
| Reference Example 8 | Ni 60% NCM | graphite | 85.2 | 112 |
| Reference Example 9 | Ni 60% NCM | SCN | 78.9 | 137 |

Referring to Table 7 above, it was found that, when a cathode active material having a Ni content of less than 88% is used, differences in the capacity retention and direct current internal resistance increase depending on the composition of the organic electrolyte are small, and are not large even when the amount of EC or the total amount of EC and FEC is changed.

As described above, according to an embodiment, the amount of nickel in the cathode active material increases to maximize the capacity of the lithium battery, and ethylene carbonate is included in the electrolyte in a predetermined amount to improve the lifetime characteristics of the lithium battery.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A lithium battery, comprising:
a cathode;
an anode; and
an electrolyte between the cathode and the anode,
wherein the electrolyte includes a lithium salt and a non-aqueous solvent including ethylene carbonate,
wherein an amount of the ethylene carbonate, per 100 parts by volume of the non-aqueous solvent, is about 5 parts by volume to about 15 parts by volume,
wherein the cathode includes a cathode active material represented by Formula 1, $$Li_xNi_yM_{1-y}O_{2-z}A_z \qquad \text{Formula 1}$$

wherein, in Formula 1,
$0.9 \leq x \leq 1.2$, $0.7 \leq y \leq 0.98$, and $0 \leq z \leq 0.2$,
M is Al, Mg, Mn, Co, Fe, Cr, V, Ti, Cu, B, Ca, Zn, Zr, Nb, Mo, Sr, Sb, W, Bi, or a combination thereof, and
A is an element having an oxidation number of −1 or −2,
wherein each element of M is independently present in an amount of $0 < (1-y) \leq 0.12$, wherein a total content of M is $0.02 \leq (1-y) \leq 0.12$, and
wherein the non-aqueous solvent further comprises an additive comprising fluoroethylene carbonate, and
an amount of the fluoroethylene carbonate, per 100 parts by volume of the non-aqueous solvent, is about 1 part by volume to about 10 parts by volume.

2. The lithium battery of claim 1,
wherein a sum of the amount of the ethylene carbonate, per 100 parts by volume of the non-aqueous solvent, and the amount of the fluoroethylene carbonate, per 100 parts by volume of the non-aqueous solvent, is about 7 parts by volume to about 15 parts by volume.

3. The lithium battery of claim 1,
wherein the non-aqueous solvent further comprises diethyl carbonate, ethyl methyl carbonate, dipropyl carbonate, methyl propyl carbonate, ethyl propyl carbonate, methyl ethyl carbonate, propylene carbonate, butylene carbonate, tetraethylene glycol dimethyl ether, or a combination thereof.

4. The lithium battery of claim 1,
wherein the non-aqueous solvent does not include methyl propionate, ethyl propionate, or propyl propionate.

5. The lithium battery of claim 1,
wherein the lithium salt includes LiPF$_6$, LiBF$_4$, LiCF$_3$SO$_3$, Li(CF$_3$SO$_2$)$_2$N, LiC$_2$F$_5$SO$_3$, Li(FSO$_2$)$_2$N, LiC$_4$F$_9$SO$_3$, LiN(SO$_2$CF$_2$CF$_3$)$_2$, a compound represented by Formulae 22 to 25, or a combination thereof, wherein

Formula 22

Formula 23

Formula 24

Formula 25

6. The lithium battery of claim 1,
wherein a concentration of the lithium salt in the electrolyte is about 1.1 molar to about 2.5 molar.

7. The lithium battery of claim 1,
wherein the electrolyte further comprises vinylene carbonate, vinyl ethylene carbonate, maleic anhydride, succinic anhydride, a phosphorus containing compound, a sulfur containing compound, or a combination thereof,
wherein the phosphorus containing compound is a phosphine compound, a phosphate compound, a phosphite compound, or a combination thereof,
wherein the sulfur containing compound is a sulfone compound, a sulfonate compound, a sultone compound, a disulfonate compound or a combination thereof, and
wherein an amount of the vinylene carbonate, the vinyl ethylene carbonate, the maleic anhydride, the succinic anhydride, the phosphorus containing compound, the sulfur containing compound, or the combination thereof, per 100 parts by weight of the electrolyte, is about 0.1 parts by weight to about 2 parts by weight.

8. The lithium battery of claim 1,
wherein the electrolyte is included in the lithium battery in an amount of about 1 gram per ampere hour to about 3 grams per ampere hour.

9. The lithium battery of claim 1,
wherein the cathode active material is represented by Formula 3 or 4, wherein $$Li_{x'}Ni_{y'}Co_{1-y'-z'}Al_{z'}O_2 \qquad \text{Formula 3}$$

$$Li_{x'}Ni_{y'}Co_{1-y'-z'}Mn_{z'}O_2 \qquad \text{Formula 4}$$

wherein $0.9 \leq x' \leq 1.2$, $0.88 \leq y' \leq 0.98$, $0 < z' < 0.1$, and $0 < 1-y'-z' < 0.12$.

10. The lithium battery of claim 1,
wherein the cathode includes Li$_{1.02}$Ni$_{0.88}$Co$_{0.08}$Mn$_{0.04}$O$_2$, Li$_{1.02}$Ni$_{0.88}$Co$_{0.10}$Mn$_{0.02}$O$_2$, Li$_{1.02}$Ni$_{0.91}$Co$_{0.06}$Mn$_{0.03}$O$_2$, LiNi$_{0.94}$Co$_{0.04}$Mn$_{0.02}$O$_2$, Li$_{1.02}$Ni$_{0.88}$Co$_{0.08}$Al$_{0.04}$O$_2$, Li$_{1.02}$Ni$_{0.88}$Co$_{0.10}$Al$_{0.02}$O$_2$, Li$_{1.02}$Ni$_{0.91}$Co$_{0.06}$Al$_{0.03}$O$_2$, LiNi$_{0.94}$Co$_{0.04}$Al$_{0.02}$O$_2$, or a combination thereof.

11. The lithium battery of claim 1,
wherein the anode comprises an anode active material, and
wherein the anode active material comprises a silicon compound, a silicon oxide of the formula SiO$_{x1}$ wherein $0 < x1 < 2$, a carbon compound, a composite of a silicon compound and a carbon compound, or a combination thereof.

12. The lithium battery of claim 11,
wherein the carbon compound includes graphite.

13. The lithium battery of claim 1,
wherein the lithium battery has a capacity retention of 80% to 88.4% after 200 charge-discharge cycles at 25° C.

14. The lithium battery of claim 1,
wherein the lithium battery has a direct current internal resistance of 105% to 180% after 200 charge-discharge cycles at 25° C.

15. The lithium battery of claim 1,
wherein the lithium battery has a cell energy density of 600 watt-hours per liter to 900 watt-hours per liter.

16. A lithium battery, comprising:
a cathode;
an anode,
    the anode comprising an anode active material, and the anode active material comprising a silicon compound, a silicon oxide of the formula $SiO_{x1}$ wherein $0<x1<2$, a carbon compound, a composite of a silicon compound and a carbon compound, or a combination thereof, wherein the silicon composite includes silicon particles with an average particle diameter of 10 nanometers to 200 nanometers; and
an electrolyte between the cathode and the anode;
wherein the electrolyte includes a lithium salt and a non-aqueous solvent including ethylene carbonate,
wherein an amount of the ethylene carbonate, per 100 parts by volume of the non-aqueous solvent, is about 5 parts by volume to about 15 parts by volume,
wherein the cathode includes a cathode active material represented by Formula 1, $$Li_xNi_yM_{1-y}O_{2-z}A_z \quad \text{Formula 1}$$

wherein, in Formula 1,
$0.9 \leq x \leq 1.2$, $0.7 \leq y \leq 0.98$, and $0 \leq z \leq 0.2$,
M is Al, Mg, Mn, Co, Fe, Cr, V, Ti, Cu, B, Ca, Zn, Zr, Nb, Mo, Sr, Sb, W, Bi, or a combination thereof, and
A is an element having an oxidation number of −1 or −2,
wherein each element of M is independently present in an amount of $0<(1-y)\leq 0.12$, wherein a total content of M is $0.02\leq(1-y)\leq 0.12$.

17. A lithium battery, comprising:
a cathode;
an anode; and
an electrolyte between the cathode and the anode,
wherein the electrolyte includes a lithium salt and a non-aqueous solvent including ethylene carbonate,
wherein an amount of the ethylene carbonate, per 100 parts by volume of the non-aqueous solvent, is about 5 parts by volume to about 15 parts by volume, and
wherein the cathode includes a cathode active material represented by Formula 1, $$Li_xNi_yM_{1-y}O_{2-z}A_z \quad \text{Formula 1}$$

wherein, in Formula 1,
$0.9 \leq x \leq 1.2$, $0.7 \leq y \leq 0.98$, and $0 \leq z \leq 0.2$,
M is Al, Mg, Mn, Co, Fe, Cr, V, Ti, Cu, B, Ca, Zn, Zr, Nb, Mo, Sr, Sb, W, Bi, or a combination thereof, and
A is an element having an oxidation number of −1 or −2,
wherein each element of M is independently present in an amount of $0<(1-y)\leq 0.3$, wherein a total content of M is $0.02\leq(1-y)\leq 0.3$,
wherein the cathode has a current density of about 5.8 milliampere-hours per square centimeter to about 6.3 milliampere-hours per square centimeter,
wherein the non-aqueous solvent further comprises dimethyl carbonate,
wherein an amount of the dimethyl carbonate, per 100 parts by volume of the non-aqueous solvent, is about 55 parts by volume to about 80 parts by volume, and
wherein the non-aqueous solvent further comprises an additive comprising fluoroethylene carbonate, and
an amount of the fluoroethylene carbonate, per 100 parts by volume of the non-aqueous solvent, is about 1 part by volume to about 10 parts by volume.

18. The lithium battery of claim 17,
wherein the lithium battery has a direct current internal resistance of 105% to 120% after 200 charge-discharge cycles at 25° C.

* * * * *